United States Patent
Guo et al.

(10) Patent No.: US 6,437,937 B1
(45) Date of Patent: Aug. 20, 2002

(54) DISK DRIVE WITH HIGH SPEED READ/WRITE CAPABILITY

(75) Inventors: Lin Guo, Milpitas; Youping Deng, Sunnyvale, both of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/556,710

(22) Filed: Apr. 24, 2000

(51) Int. Cl.⁷ .............................................. G11B 5/596
(52) U.S. Cl. ................................ 360/78.05; 360/78.12; 360/63
(58) Field of Search ............................ 360/78.05, 69, 360/75, 63, 78.12; 369/44.11; 711/112, 4

(56) References Cited

U.S. PATENT DOCUMENTS

| | | | |
|---|---|---|---|
| 5,189,578 A | | 2/1993 | Mori et al. ................. 360/106 |
| 5,303,105 A | | 4/1994 | Jorgenson ................... 360/106 |
| 5,341,351 A | * | 8/1994 | Ng .............................. 711/112 |
| 5,452,275 A | * | 9/1995 | Ogawa ..................... 369/44.11 |
| 5,521,778 A | | 5/1996 | Boutaghou et al. ......... 360/106 |
| 5,856,896 A | | 1/1999 | Berg et al. .................. 360/104 |
| 5,901,010 A | * | 5/1999 | Glover et al. ............ 360/78.12 |
| 5,920,441 A | * | 7/1999 | Cunningham et al. ... 360/78.05 |
| 6,005,742 A | * | 12/1999 | Cunningham et al. ... 360/78.05 |
| 6,034,834 A | * | 3/2000 | Yoshikawa et al. ........... 360/75 |
| 6,088,187 A | * | 7/2000 | Takaishi ................. 360/78.05 |
| 6,160,676 A | * | 12/2000 | Takaishi ................. 360/78.05 |
| 6,292,320 B1 | * | 9/2001 | Mason et al. ................. 360/63 |
| 6,320,720 B1 | * | 11/2001 | Hattori ..................... 360/78.05 |

OTHER PUBLICATIONS

U.S. Application Ser. No. 09/073,600, filed May 6, 1998, entitled "Parallel Servo with Ultra High Bandwidth Off–Track Detection," and assigned to the assignee of the present invention.
U.S. Applications Ser. No. 09/388,512 filed Sep. 2, 1999, entitled "Method and Apparatus for Performing a Flaw Scan of a Disk Drive," and assigned to the assignee of the present invention.

* cited by examiner

Primary Examiner—David Hudspeth
Assistant Examiner—Fred F. Tzeng
(74) Attorney, Agent, or Firm—David M. Sigmond (57) ABSTRACT

The present invention is directed to a disk drive that utilizes a multi-stage actuator associated with two or more heads that are each associated with a separate disk surface to realize high speed data transfers. In one embodiment, the multi-stage actuator is used to simultaneously transfer portions of a data file between the heads and the associated disk surfaces and to perform simultaneous seek operations for the heads between data transfer operations. In another embodiment, the multi-stage actuator is used to alternatingly transfer portions of a data file between the heads and the associated disk surfaces and to perform alternating seek operations for the heads such that one head is transferring data while another head is performing a seek operation.

50 Claims, 5 Drawing Sheets

Fig. 5

DISK DRIVE WITH HIGH SPEED READ/WRITE CAPABILITY

FIELD OF THE INVENTION

The present invention relates to disk drives and, in particular, to disk drives that employ multi-stage actuators to position heads over disk surfaces.

BACKGROUND OF THE INVENTION

A disk drive is a device that is commonly employed in computer systems to store data. Typically, a disk drive includes: (1) one or more disks that each have a plurality of concentric tracks on which data is stored; (2) a spin motor for rotating the disk or disks; (3) one or more heads that are each capable of writing and/or reading data to/from a track on a disk; (4) an actuator for moving the head or heads to a desired location adjacent to a disk so that data can be written to the disk or read from the disk; and (5) circuitry for transferring data between a disk and a portion of a host computer system that is exterior to the disk drive, such as a random access memory (RAM).

A disk drive also typically includes a servo system that operates to move a head over a defined track on a disk surface and maintain the head over the defined track until directed to move the head over a different track. The servo system maintains the position of the head over a defined track based upon information that is read from a servo track. In one type of drive, the servo tracks are embedded in or coincident with the user data tracks, i.e., the servo track and the user data track form a single physical track with the servo data interspersed among the user data. Typically, the servo track: (1) identifies the particular track over which a head is positioned; and (2) provides data from which the position of the head relative to the center line of the track can be determined. The identification of the particular track is primarily used when the head is being moved from one track to another track (which is commonly known as a seek operation) to determine when the head is positioned over the desired track. Once the head is over the desired track, data indicating the position of the head relative to the center line of the track is determined and used to maintain the head over the desired track (which is commonly known as a tracking operation). For example, if the data indicates that the head is positioned to one side of the center line, the servo system causes the actuator to move the head towards the center line.

As track densities increase, it becomes increasingly difficult for the servo system to maintain the head over a desired location on the disk surface. This difficulty stems, in part, from the difficulty that the servo system has in making the very fine adjustments needed to position the heads over increasingly narrow tracks with an actuator that has relatively high inertia and multiple mechanical resonant modes. To address this problem, a two-stage (or dual-stage) actuator has been implemented that includes a primary actuator and a secondary actuator. The primary actuator is used by the servo system to perform large or coarse movements of the head. The secondary actuator, which rides on the primary actuator, is used by the servo system to perform the small or fine movements of the head needed to maintain the head over the increasingly narrower and denser tracks. The primary actuator simultaneously adjusts the position of all the heads in the disk drive, whereas the secondary actuators each adjust the position of a single head without affecting the position of the other heads.

The throughput or data transfer rate of a disk drive is a key performance characteristic. Needless to say, there is a continuing need to increase the speed at which the disk drive can transfer data to and from the exterior environment.

SUMMARY OF THE INVENTION

The present invention is directed to disk drive that uses a multi-stage actuator to achieve an increased throughput or data transfer rate between the disk and the exterior environment.

A disk drive is provided that includes a disk that is capable of storing data on both surfaces of the disk. Associated with each surface of the disk is a head for transferring data between the disk surface and the exterior environment. A multi-stage actuator is used to move the heads to desired positions over the disk surfaces for the transfer of data. The multi-stage actuator includes a primary actuator for coarsely positioning the heads and secondary actuators (one per head) that position the heads more finely than the primary actuator is readily capable of doing. A data transfer device uses the primary and secondary actuators in a manner that provides an increased throughput (i.e., increased rate of data transfer per unit time), particularly with respect to the transfer of large data files. The data transfer device makes use of both heads to transfer the data associated with a particular file between the disk and the exterior environment.

Typically, the secondary actuators provide a range of motion that permits the heads to be positioned over a number of tracks when the primary actuator is at an established position. Consequently, the data transfer device can realize even greater throughput by causing the secondary actuators to move the heads to write and read to and from a number of different tracks while gradually repositioning the primary actuator so that the coarse positioning operation need not interrupt the data transfer operation.

In one embodiment, the data transfer device simultaneously uses both heads to transfer data between the disk and the exterior environment. In this embodiment, the data transfer device, in the case of a write operation, divides a file into segments. The odd numbered segments are to be written to a first disk surface using the first head, and the even numbered segments are to be written to a second disk surface using the second head. The data transfer device also causes the primary actuator to coarsely position the heads and the secondary actuators to finely position the heads. Once the heads are positioned, the data transfer device causes the odd numbered segments to be provided to the first head at the same time that the even numbered segments are being provided to the second head. Consequently, the throughput is substantially doubled relative to a disk drive that only uses one head at a time to write data to a single disk surface. Similarly, during a read operation, the data transfer device positions the first and second heads, the first head reads the odd numbered segments from the first disk surface at the same time that the second head reads the even numbered segments from the second disk surface, the segments are combined into the file and the file is transferred to the exterior environment.

In another embodiment, the data transfer device uses each head in an alternating fashion to transfer data between the disk and the exterior environment such that, after a portion of a file is transferred by one of the heads, one head is transferring data while the other head is being moved by a secondary actuator to a new location over the disk to perform the next data transfer. For example, in the case of a write operation, the data transfer device initially causes the primary actuator to coarsely position the heads and the secondary actuators to finely position the heads over the tracks where the first segments of a particular file are to be written. The data transfer device then causes the first head to write data on the first disk surface, and after the first head has finished writing, causes the second head to write data to the second disk surface. Further, while the second head is writing data to the second disk surface, the data transfer device uses the secondary actuator associated with the first head to reposition the first head over the next track on which data is to be written. By the time the second head is finished writing data to the second disk surface, the first head is positioned over the desired track on the first disk surface and begins writing to the first disk surface. This process of writing one portion of a file with one head while repositioning the other head for subsequently writing the next portion of the file continues until the entire file has been written. Similarly, during a read operation, the data transfer device alternatingly uses the heads to read the data file, and while one head is reading the data the other head is positioned over the desired track where the next read operation occurs.

DETAILED DESCRIPTION

Figure 1A:
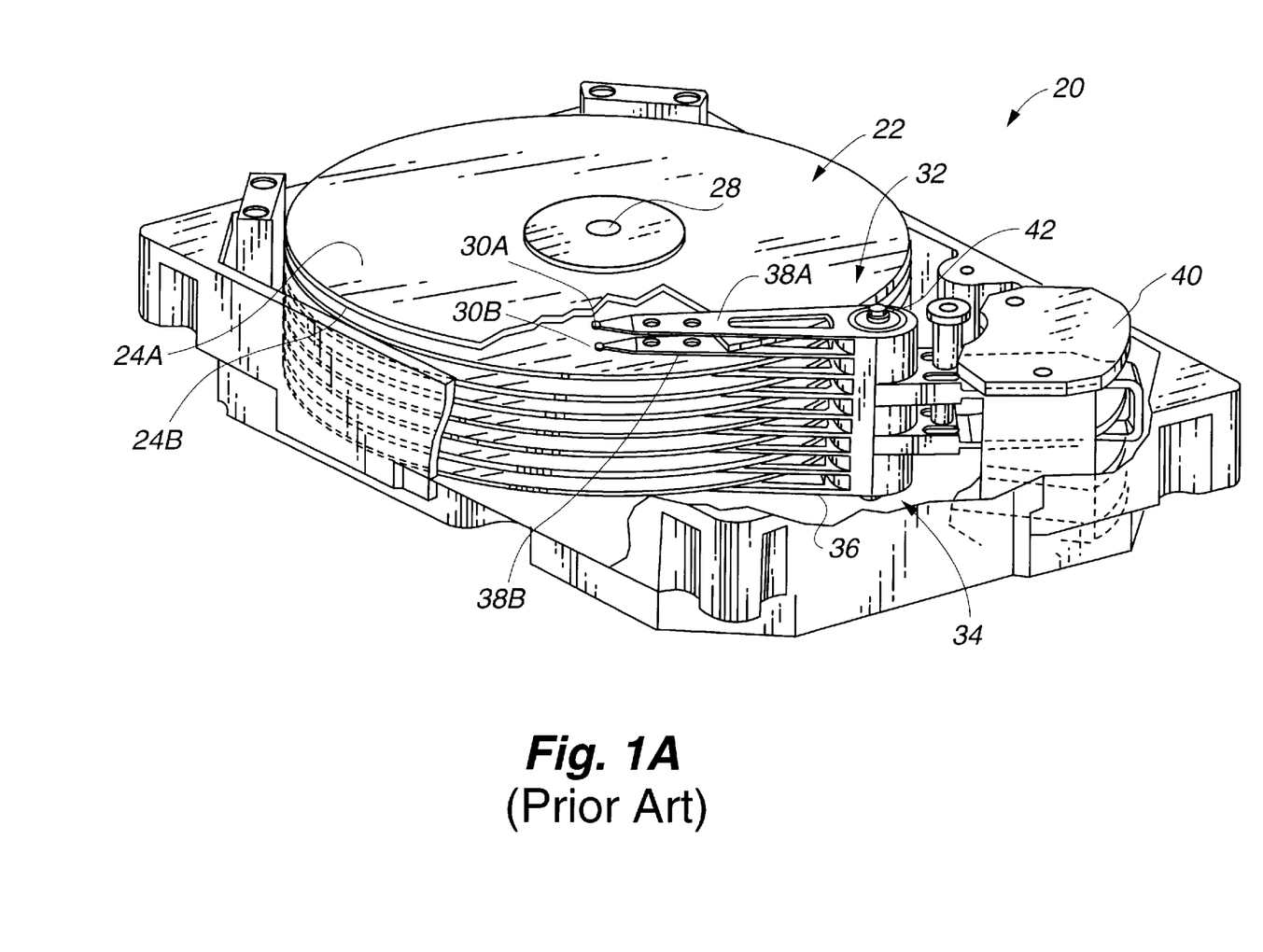
FIG. 1A illustrates a typical disk drive with a multi-stage actuator.
Figure 1B:
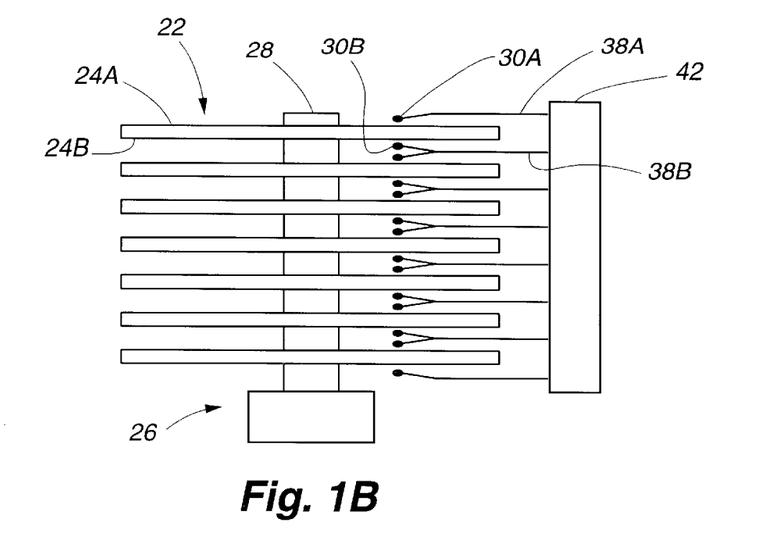
FIG. 1B is a functional side view of certain components of the disk drive shown in FIG. 1A.

FIGS. 1A and 1B illustrate a typical disk drive 20 that includes a plurality of disks. To simplify the description of the invention, it is only necessary to consider a single magnetic disk 22. It should, however, be appreciated that the invention is adaptable to disk drives that include multiple disks. The disk 22 is capable of storing data in concentric tracks located on a first surface 24A and an opposing second surface 24B of the disk 22. A spin motor 26 is used to rotate the disk 22 about a central axis 28 at a substantially constant rotational velocity.

A first head 30A is provided for transferring data between the first surface 24A of the disk 22 and the exterior environment. Similarly, a second head 30B is provided for transferring data between the second surface 24B of the disk 22 and the exterior environment.

To position the first and second heads 30A, 30B over the tracks on the first and second surfaces 24A, 24B of the disk 22 so that data can be transferred, a multi-stage actuator 32 is provided. The multi-stage actuator 32 includes a primary actuator 34 for coarsely positioning the first and second heads 30A, 30B over desired locations on the first and second surfaces 24A, 24B of the disk 22. The primary actuator 34 is comprised of a carriage 36 that includes first and second arms 38A, 38B for holding, respectively, the first and second heads 30A, 30B. Typically, the first and second arms 38A, 38B each include a rigid portion and a flexible, suspension portion. The suspension portion is located between the head and the rigid portion. A voice coil motor 40 is provided for rotating the first and second arms 38A, 38B about an axis 42.

Figure 2:
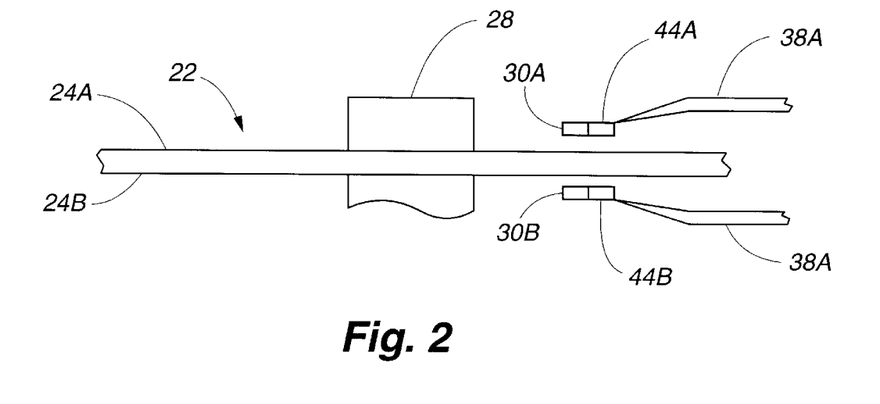
FIG. 2 is a functional diagram that shows the secondary actuators that are used to finely position heads relative to the disk surfaces.

With reference to FIG. 2, the multi-stage actuator 32 also includes secondary actuators 44A, 44B for fine positioning of, respectively, the first and second heads 30A, 30B. Typically, the secondary actuators 44A, 44B are located either: (1) between the slider associated with the head and the suspension; or (2) between the suspension and the arm. The two secondary actuators are independently controllable. Independent control allows one of the secondary actuators to be implementing a seek operation with one of the heads (i.e., moving a head from one track to another track) while the other secondary actuator is implementing a tracking operation with the other head (i.e., maintaining the position of the other head over a desired track). Further, independent control permits each of the secondary actuators 44A, 44B to be simultaneously implementing either a tracking function or a seeking function. For purposes of the description, the secondary actuators 44A, 44B are both rotary types of actuators. An example of such a secondary actuator can be found in U.S. Pat. No. 5,521,778. It should, however, be appreciated that the invention is equally applicable to a disk drive that uses a secondary actuator that moves a head in a linear manner.

The disk drive 20 further includes a data transfer device that operates in conjunction with the multi-stage actuator 32 to realize an improved throughput in the transfer data between the disk drive 20 and the exterior environment.

Figure 3:
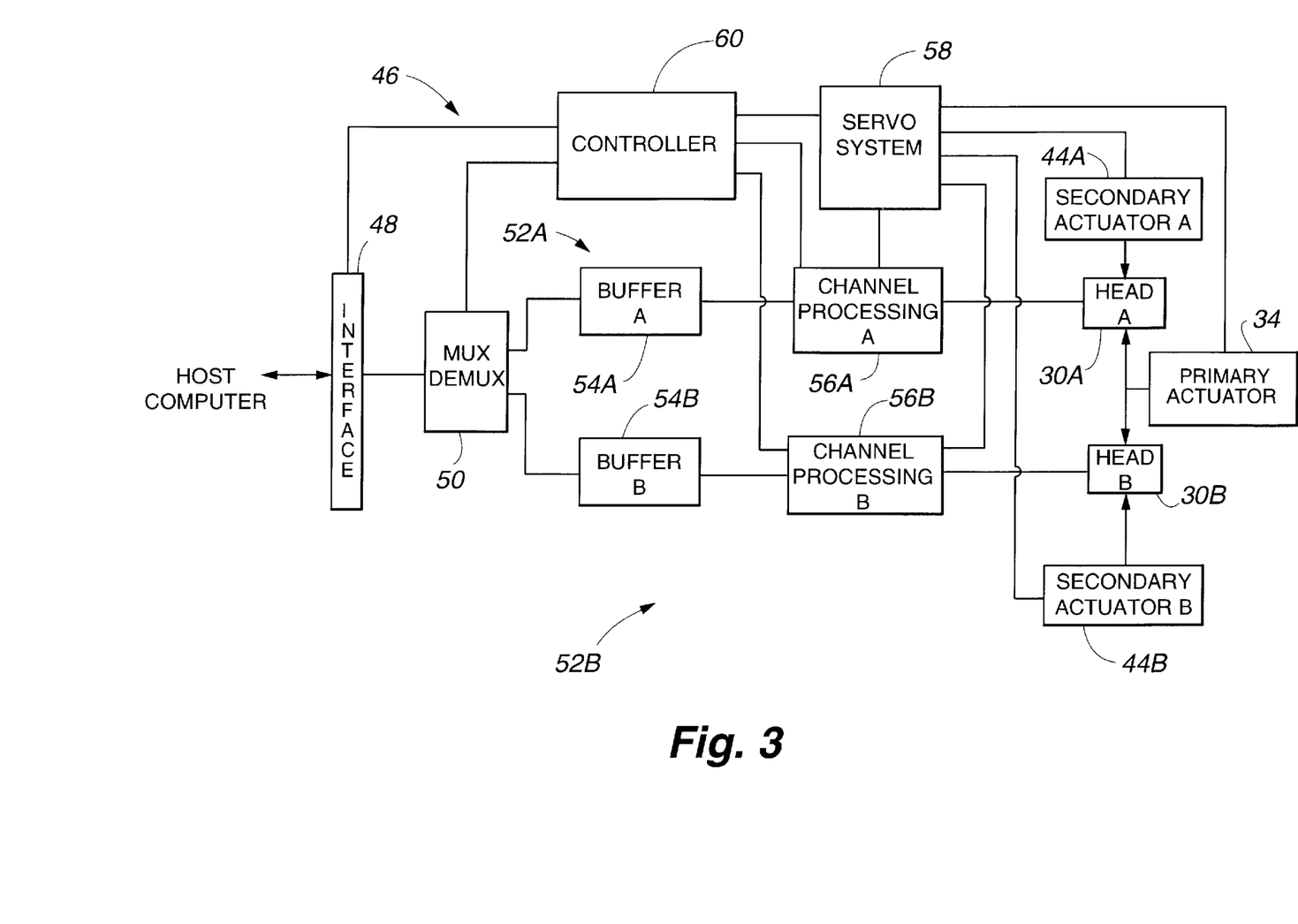
FIG. 3 shows a first embodiment of the components of a disk drive that are used to realize an increased throughput of data.

With reference to FIG. 3, an embodiment of the data transfer device 46 is illustrated that operates to simultaneously transfer data between both the first and second heads 30A, 30B and the disk 22. The device 46 includes an interface 48 that transfers data between the disk drive 20 and the exterior environment (typically, a host computer) at a rate that approaches twice the rate at which data can be transferred between either of the heads and the disk 22.

The data transfer device 46 also includes a multiplexer/demultiplexer 50. The multiplexer/demultiplexer 50 operates in the write mode to divide or split a data file that is received from the interface 48 into K segments with the odd numbered segments being routed to be written to the disk 22 using the first head 30A and the even numbered segments being routed to be written to the disk 22 using the second head 30B. For instance, the multiplexer/demultiplexer 50 defines the first 512 kilobytes of the data file as a first segment that is routed to head 30A, the second 512 kilobytes of the data file as a second segment that is routed to head 30B, the third 512 kilobytes of the data file as a third segment that is routed to head 30A, and so on, until the entire data file has been divided into consecutive segments. Accordingly, during the write operation, the multiplexer/demultiplexer 50 performs a demultiplexing function. The multiplexer/demultiplexer 50 operates in the read mode to collect the odd and even numbered segments read from disk 22 using the first and second heads 30A and 30B, respectively, and to join or merge the odd and even numbered segments into the data file that was originally received at the interface 48 before it was split or demultiplexed for writing to disk 22. For instance, the multiplexer/demultiplexer 50 initially receives the first 512 kilobyte segment read from head 30A, then the second 512 kilobyte segment read from head 30B, and so on, and assembles or concatenates the segments in sequence to recreate the original data file. Accordingly, during the read operation, the multiplexer/demultiplexer 50 performs a multiplexing function.

The data transfer device 46 also includes first and second channels 52A, 52B for managing and/or processing the data between the multiplexer/demultiplexer 50 and the first and second heads 30A, 30B. More specifically, the first channel 52A operates to manage and/or process the data between the interface 48 and the first head 30A. Likewise, the second channel 52B operates to manage and/or process the data between the interface 48 and the second head 30B. The first and second channels 52A, 52B include respective first and second buffers 54A, 54B that are each operated to compensate for a differences in the rate at which data can be transferred between the drive and the exterior environment and the rate at which data can be transferred between the disk and one of the heads. The first and second channels 52A, 52B also include respective first and second channel processing circuits 56A, 56B that each perform, for example, error correction, detection and signal processing functions.

The data transfer device 46 further includes a servo system 58 to control: (1) the primary actuator 34 to coarsely position the first and second heads 30A, 30B at a desired location over, respectively, the first and second surfaces 24A, 24B of the disk 22; and (2) the secondary actuators 44A, 44B. The servo system 58 for controlling the position of the heads via the primary actuator 34 and the secondary actuators 44A, 44B is susceptible to a number of different approaches, including the parallel loop, master-slave loop, dual feedback loop, and master-slave with decoupling approaches.

The data transfer device 46 further includes a controller 60 for coordinating the operation of the interface 48, multiplexer/demultiplexer 50, first and second channels 52A, 52B, and servo system 58. With respect to the servo system 58, the controller 60 operates to identify the tracks that the primary actuator 34 and each of the secondary actuators 44A, 44B should either be moving the heads 30A, 30B towards (i.e., seeking) or following (i.e., tracking). As is seen, controller 60 is connected to the interface 48, multiplexer/demultiplexer 50, first and second channels 52, 52B and servo system 58.

The operation of the device 46 in realizing an increased throughput typically begins with the receipt of a command from an exterior device, such as a microprocessor, directing the disk drive 20 to perform either a write operation or a read operation. In the case of a write operation, the interface 48 receives the data to be written to the disk 22. Conversely, in a read operation, the interface 48 is used to transmit data that is read from the disk 22 to the exterior environment. Regardless of whether a read or write operation is specified, the controller 60 directs the servo system 58 to use the primary actuator 34 to coarsely position the first and second heads 30A, 30B at a desired location above the first and second surfaces 24A, 24B of the disk 22. Typically, servo data or other data previously written on the disk 22 provides the information that is used by the servo system 58 to coarsely position the heads 30A, 30B at a desired location over the disk 22.

The coarse positioning is provided to maximize the rate of transferring a data file between the disk 22 and the exterior environment. For example, if the secondary actuators 44A, 44B are rotary-type actuators (like the primary actuator 34) and the secondary actuators 44A, 44B are positioned such that the heads can be moved through arcs that are centered on the longitudinal axis of the first and second arms 38A, 38B, the controller 60 and servo system 58 cause the primary actuator 34 to position the first and second heads 30A, 30B so that each head can be moved through substantially its full range of motion. Preferably, the primary actuator 34 is gradually moved or repositioned in a single radial direction during the data transfer operation while the secondary actuators 44A, 44B are adjusted in the opposite radial direction to offset the movement of primary actuator 34. By moving the secondary actuators 44A, 44B to offset the movement of the primary actuator 34, the heads 30A, 30B remain in fixed positions over the tracks during data transfer operations and are moved to adjacent tracks during seek operations as though the primary actuator 34 remained in a fixed position. The gradual radial movement of the primary actuator 34 and opposing motions of the secondary actuators 44A, 44B brings new radial tracks within the range of motion of the secondary actuators 44A, 44B. Thus, the offsetting radial movements of the primary actuator 34 and secondary actuators 44A, 44B enables the secondary actuators 44A, 44B to position the heads 30A, 30B over new tracks which fall within the range of motion of the secondary actuators 44A, 44B. Although tracks which heads 30A, 30B had previously accessed consequently fall outside this range of motion, this is an acceptable tradeoff. Moreover, this enables the heads 30A, 30B to transfer data to and from the new tracks without being interrupted or delayed by the coarse positioning operation of the primary actuator 34.

The controller 60 also directs the servo system 58 to use the secondary actuators 44A, 44B to do the fine positioning of the first and second heads 30A, 30B at, respectively, the first track on the first surface 24A on which data is to be written by the first head 30A and the first track on the second surface 24B on which data is to be written by the second head 30B. As previously noted, the first tracks are likely to be at or near the limit of the range of motion of the secondary actuators 44A, 44B to reduce or minimize the number of seek operations needed to transfer a data file between the disk 22 and the exterior environment.

Once the initial coarse and fine positioning operations have been completed, the controller 60 directs the data file being received from the exterior environment to be divided into two streams of data that are each substantially simultaneously written by the first and second heads 30A, 30B to the first and second surfaces 24A, 24B of the disk 22. More specifically, the multiplexer/demultiplexer 50 divides the data file into K segments that, for purposes of conceptualizing the operation, are each given a number beginning with the number 1 and proceeding in consecutive order.

The two streams of data produced by the multiplexer/demultiplexer 50 are respectively provided to the first and second channels 52A, 52B, which ultimately convey the two streams of data to the first and second heads 30A, 30B. To elaborate, the odd numbered segments of data are provided to the first buffer 54A and, under the direction of the controller 60, transferred to the first channel processing circuit 56A. As previously noted, the first channel processing circuit 56A may perform certain error correction and signal processing related functions on the data before the data is provided to the first head 30A for writing on the first surface 24A of the disk 22. At substantially the same time that the controller 60 provides the odd numbered segments to the first channel 52A, the controller 60 provides the even numbered segments to the second channel 52B. The second channel 52B operates on the even numbered segments in the same manner that the first channel 52A operates on the odd numbered segments. Consequently, the odd numbered segments and even numbered segments are respectively provided to the first and second heads 30A, 30B at substantially the same time for writing to the respective first and second surfaces 24A, 24B.

The buffers 54A, 54B each store 512 kilobytes, corresponding to a single segment. The buffers 54A, 54B can each wait to receive an entire segment, then transfer the entire segment to the respective channel processing circuits 56A, 56B, then wait to receive another entire segment, and so on. Alternatively, the buffers 54A, 54B can begin transferring an incoming segment to the respective channel processing circuits 56A, 56B before the entire segment has been received.

The controller 60 causes the servo system 58 to use the secondary actuators 44A, 44B to maintain the heads 30A, 30B over the initial tracks on which the first and second segments of data from the data file are to be written. If the initial tracks can store all K segments then the write operation is completed on the initial tracks. If, however, the initial tracks cannot store all K segments, then the controller 60 instructs the servo system 58 to use secondary actuators 44A, 44B to move heads 30A, 30B to the next tracks, which typically are adjacent to the initial tracks. During the movement of the heads from the initial tracks to the next tracks on which the data segments are to be written, i.e., during the seek operation, no data is transferred from the heads to the disk. Once the heads 30A, 30B are positioned over the next tracks, the simultaneous writing of the odd and even segments commences, and if more data remains after the next tracks are full then the heads 30A, 30B are positioned again to the next adjacent tracks in the same radial direction. This process continues while primary actuator 34 is gradually moved in the radial direction towards the next adjacent tracks until the odd numbered segments have been written on first surface 24A of the disk 22 and the even numbered segments have been written to the second surface 24B of the disk 22 (assuming the data file does not exceed the disk capacity). Even though there are no data transfers between the heads 30A, 30B and the disk 22 during the times when the secondary actuators 44A, 44B simultaneously move their heads 30A, 30B to new tracks during a seek operation, there typically are substantial periods of time between seek operations when the data is being simultaneously written by both of the heads 30A, 30B. Moreover, no delays are caused by the course positioning of the primary actuator 34.

Preferably, the controller 60 writes the data file to tracks that contain little or no user data. For instance, the initial tracks may contain some user data whereas the remaining tracks do not. Alternatively, the controller 60 can write the data file to tracks that contain no user data (or only user data that can be written over, such as an earlier version of the data file). Optimization techniques for detecting such tracks are well-known in the art. In this manner, the controller 60 increases the throughput of the disk drive 20.

The read operation is substantially identical to the write operation described above except that: (1) data is transferred from the disk 22 to the exterior environment; and (2) the multiplexer/demultiplexer 50 is used to reassemble or concatenate the odd data segments read by the first head 30A and the even data segments read by the second head 30B into the data file.

Figure 4:
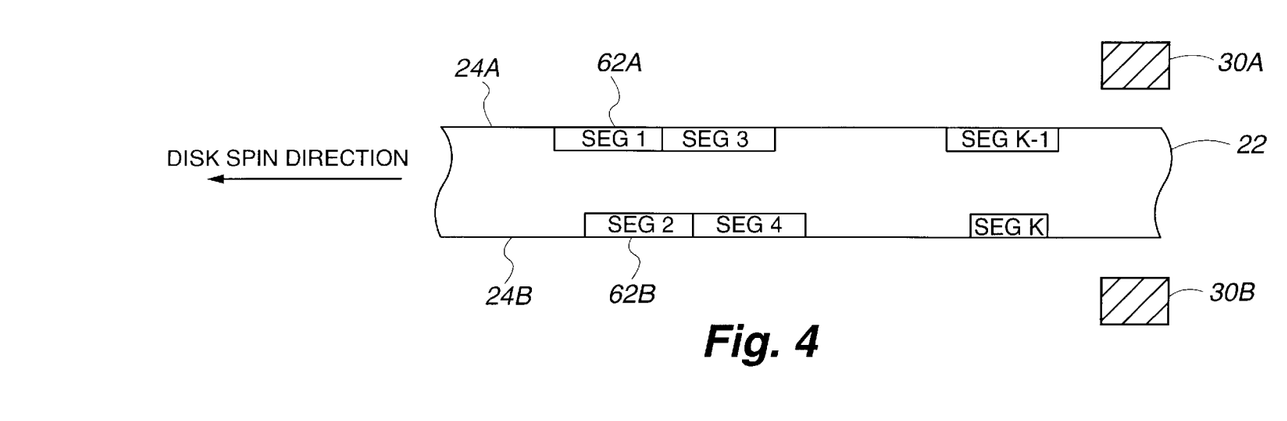
FIG. 4 illustrates a data transfer operation between a disk and the heads when the first embodiment of the invention shown in FIG. 3 is utilized.

With reference to FIG. 4, a data transfer operation in accordance with data transfer device 46 is illustrated. In this example, the data file is divided into K segments. The first K−1 segments each contain 512 kilobytes, and the final K segment contains 300 kilobytes (the remainder of data file). Initial track 62A on surface 24A of disk 22 is capable of storing the K/2 odd segments (seg 1, seg 3, . ... seg K−1) written to track 62A by head 30A, and initial track 62B on surface 24B of disk 22 is capable of storing the K/2 even segments (seg 2, seg 4,. ... seg K) written to track 62B by head 30B. The segments are written consecutively (seg 1, seg 2, etc.) yet there is time overlap between consecutively written segments (head 30B begins to write seg 2 while head 30A writes seg 1, etc.). Although heads 30A, 30B are aligned with one another in the disk spin direction, the odd segments are written sooner than the immediately following even segments since multiplexer/demultiplexer 50 switches the odd segments to buffer 54A before switching the immediately following even segments to buffer 54B. As a result, the odd segments are offset or shifted in the disk spin direction with respect to the even segments. Further, the first K−1 segments are larger than the final K segment. It is understood that the depiction in FIG. 4 is not drawn to scale.

Figure 5:
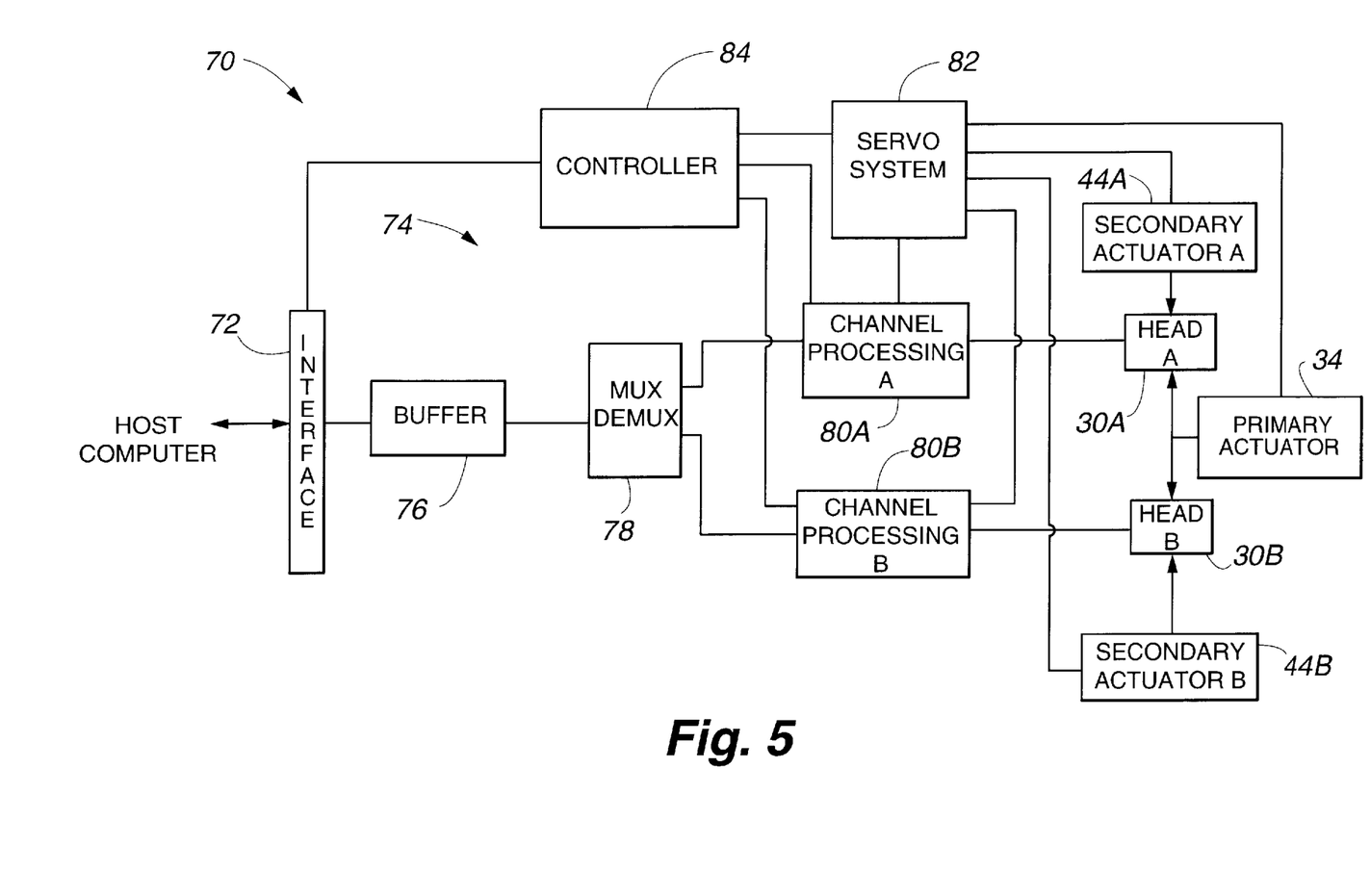
FIG. 5 show a second embodiment of the components of a disk drive that are used to realize an increased throughput of data.

With reference to FIG. 5, a second embodiment of the data transfer device is illustrated that operates to alternatingly transfer data between the first and second heads 30A, 30B and the disk 22. The data transfer device 70 includes an interface 72 that is capable of transferring data between the disk drive 20 and the exterior environment at a predetermined rate. Interface 72 is similar to interface 48 except that interface 72 transfers data between the disk drive 20 and the exterior environment at a rate that approaches the rate (rather than twice the rate) at which data can be transferred between either of the heads and the disk 22.

The data transfer device 70 also includes a channel 74 for managing and/or processing the data between the interface 72 and the first and second heads 30A, 30B. The channel 74 includes a buffer 76 (similar to buffers 54A, 54B) that compensates for differences in the rate at which data can be transferred between the drive and the exterior environment and the rate at which data can be transferred between the disk and one of the heads. It is noted that these rate differences are not as large as those experienced by buffers 54A, 54B. The channel 74 further includes a multiplexer/demultiplexer 78 (similar to multiplexer/demultiplexer 50) and channel processing circuits 80A, 80B (similar to channel processing circuits 56A, 56B).

The data transfer device 70 further includes a servo system 82 (similar to servo system 58) and a controller 84. Controller 84 is generally similar to controller 60, but contains different program code for implementing different operations in data transfer device 70 as described below.

The data transfer device 70 differs from the data transfer device 46 in several respects. For instance, data transfer device 70 includes buffer 76 coupled between interface 72 and multiplexer/demultiplexer 78, and buffers are not coupled between multiplexer/demultiplexer 78 and channel processing circuits 56A, 56B. The segment sizes correspond to the available user data storage capacity of the tracks rather than the buffer. That is, the segment sizes correspond to the storage space that the respective tracks have to store the user data (either because the user data regions are empty or they contain user data that can be overwritten). It is understood in some instances the segment size may not correspond to the available user data storage capacity of the track it is written to, for instance, (1) for the first and only segment if the data file is smaller than the available user data storage capacity of the first track; or (2) for the final segment if the final portion of the data file is smaller than the available user data storage capacity of the track to which it is written.

Controller 84 instructs heads 30A and 30B to read and write the segments one head at a time at separate non-overlapping times. As a result, interface 72 transfers the data at a rate approaching the data transfer rate of heads 30A, 30B. Furthermore, controller 84 instructs secondary actuator 44A to move head 30A to the next adjacent track during a seek operation while head 30B performs a data transfer operation, and likewise, controller 84 instructs secondary actuator 44B to move head 30B to the next adjacent track during a seek operation while head 30A performs a data transfer operation. Thus, although heads 30A and 30B do not perform simultaneous data transfer operations, the data transfer operation between disk 22 and interface 72 is essentially continuous since heads 30A and 30B alternatingly transfer the data and reposition to the next tracks.

The operation of the device 70 in realizing an increased throughput typically begins with the receipt of a command from an exterior device, such as a microprocessor, directing the disk drive 20 to perform either a write operation or a read operation. In the case of a write operation, the interface 72 receives the data to be written to the disk 22. Conversely, in a read operation, the interface 72 is used to transmit data that is read from the disk 22 to the exterior environment. Regardless of whether a read or write operation is specified, the controller 84 directs the servo system 82 to use the primary actuator 34 to coarsely position the first and second heads 30A, 30B at a desired location above the first and second surfaces 24A, 24B of the disk 22. Typically, servo data previously written on the disk surface provides the information that is used by the servo system 82 to coarsely position the heads 30A, 30B at a desired location over the disk 22. The coarse positioning, as previously described with respect to data transfer device 46, is accomplished so as to maximize the rate of transferring a data file between the disk 22 and the exterior environment.

The controller 84 also directs the servo system 82 to use the secondary actuators 44A, 44B to do the fine positioning of the first and second heads 30A, 30B at, respectively, the first track on the first surface 24A on which data is to be written by the first head 30A and the first track on the second surface 24B on which data is to be written by the second head 30B. As previously noted, the first tracks are likely to be at or near the limit of the range of motion of the secondary actuators 44A, 44B.

Once the initial coarse and fine positioning operations have been completed, the controller 84 uses the multiplexer/demultiplexer 78 to divide the data file being provided by the interface 72 into two streams of data that are alternatingly applied to the first and second heads 30A, 30B for writing on the first and second surfaces 24A, 24B of the disk 22. More specifically, the multiplexer/demultiplexer 78 divides the data file into K segments that, for purposes of conceptualizing the operation, are each given a number beginning with the number 1 and proceeding in consecutive order. The odd numbered segments of data are provided to the first head 30A and the even numbered segments are provided to the second head 30B in an alternating fashion such that one head is substantially always writing data to the disk 22. The buffer 76 stores 512 kilobytes, which can be transferred to the multiplexer/demultiplexer 78 in discreet 512 kilobyte bursts or continuously as data is received from the interface 72. However, the segments each have a size that corresponds to the available user data storage capability of a track (rather than the buffer). The segment size can be dynamically adjusted to account for the user data storage capacity of individual tracks, for instance, if the tracks are partially filled with user data, or if the track capacity changes due to zone density recording or defective sectors.

The controller causes the servo system 58 to use the primary actuator 34 and the secondary actuators 44A, 44B to initially place head 30A over a first track in a first band of tracks on surface 24A and initially place head 30B over a first track in a second band of tracks on surface 24B. The first segment is written to the first track in the first band of tracks, and then the second segment is written to the first track in the second band of tracks. Initially, the first head 30A writes the first segment to the first track in the first band of tracks. This normally entails a single revolution of the disk 22 so that the first track can be fully written to (i.e., the maximum amount of user data that the track can store is written to the track). Immediately after first head 30 completes writing the first segment, the secondary actuator 44A repositions the first head 30A over the second track in the first band of tracks while the second head 30B writes the second segment to the first track in the second band of tracks. Therefore, the writing of the first and second segments is sequential and non-overlapping and essentially continuous. Furthermore, the secondary actuator 44A repositions the first head 30A over the second track in the first band of tracks (i.e., completes the seek operation) before the second head 30B completes writing the second segment. Immediately after the second head 30B completes writing the second segment, the first head 30A writes the third segment to the second track in the first band of tracks and the secondary actuator 44B repositions the second head 30B over the second track in the second band of tracks. Therefore, the writing of the second and third segments is sequential and non-overlapping and essentially continuous. The process continues in which first head 30A writes the next odd segment to the next track in the first band of tracks and the second head 30B then writes the next even segment to the next track in the second band of tracks. While this occurs, the primary actuator 34 is gradually moved in the radial direction from the first tracks towards the second tracks while the secondary actuators 44A, 44B are moved in the opposite radial direction between seeks to offset the movement of the primary actuator 34 such that the heads 30A, 30B have no net movement. This enables heads 30A, 30B to write to disk 22 while the primary actuator 34 coarsely positions heads 30A, 30B over the first and second bands of tracks. As a result, the data transfer operation alternatingly switches between the heads and is essentially continuous during both the coarse and fine positioning operations.

Preferably, the controller 84 writes the data file to tracks that contain little or no user data in a manner similar to that described above for controller 60.

The read operation is substantially identical to the write operation described above except that: (1) data is transferred from the disk 22 to the exterior environment and (2) the multiplexer/demultiplexer 78 is used to reassemble or concatenate the data segments read by the first head 30A and the data segments read by the second head 30B into the data file.

Figure 6:
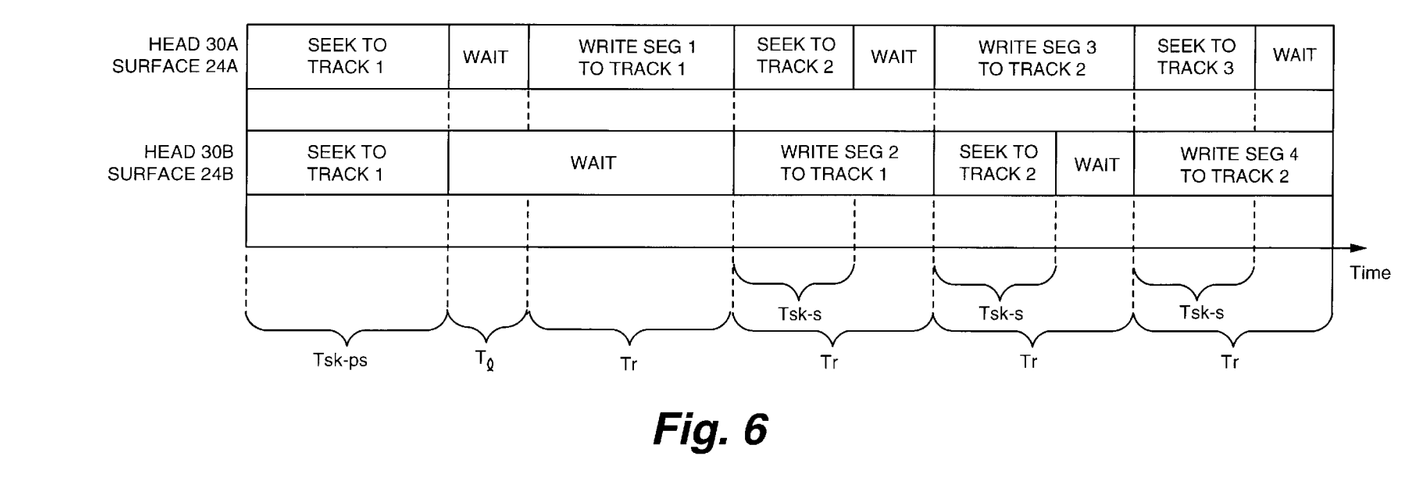
FIG. 6 illustrates a data transfer operation between the disk and the heads when the second embodiment of the invention shown in FIG. 5 is utilized.

With reference to FIG. 6, a time line illustrates the operations performed when the heads 30A, 30B write data to the first and second surfaces 24A, 24B of the disk 22. The abbreviation $T_{sk-ps}$ refers to the time required for the primary actuator 34 and secondary actuator 44A to coarsely position the heads over the bands of tracks to which a data file is to written and to finely position the heads over the first tracks in the bands of tracks to which the data will be initially written (both primary actuator 34 and secondary actuators 44A, 44B are used in this seek operation, thus the notation "ps"); the abbreviation $T_l$ refers to the rotational latency associated with waiting for the head 30A, once radially positioned over the first track, to be positioned over the desired circumferential location on the first track; the abbreviation $T_{sk-s}$ refers to the time associated with moving a head from one track to the next track on which a data segment is to be written (only secondary actuators 44A, 44B are used in this seek operation, thus the notation "s"); and $T_r$ refers to the time needed to complete one revolution of the disk, which is also the time during which a segment is written to a track.

With the foregoing abbreviations in mind, the write operation commences with the servo system positioning the heads 30A, 30B over desired locations on the first and second surfaces 24A, 24B of the disk 22 using the primary actuator 34 and the secondary actuators 44A, 44B during time $T_{sk-ps}$. Once the heads 30A, 30B have been positioned, a rotational latency delay occurs so that the proper circumferential portion of the first track becomes positioned below head 30A during time $T_l$. When this occurs, the controller 84 instructs the multiplexer/demultiplexer 78 to direct the first segment in the data file to the first head 30A which writes the first segment on the first track in the first band of tracks on the first surface 24A of the disk 22 within the time $T_r$, i.e., one revolution of the disk 22. Once the first segment has been written, the controller 84 instructs the multiplexer/demultiplexer 78 to direct the second segment of the data file to the second head 30B, which writes the data on the first track in the second band of tracks on the second surface 24B of the disk 22 within the time $T_r$. While the second segment is being written to the disk 22, the controller 84 directs the secondary actuator 44A to move the first head 30A to the next track in the first band of tracks. Consequently, the first head 30A is in position to write the third segment immediately after the second head 30B is finished writing the second segment. By writing data to the disk 22 in this fashion, there is substantially no time during which data is not being written to the disk 22 by one head or the other head. Furthermore, as this occurs, the primary actuator 34 simultaneously performs the coarse positioning operation while the secondary actuators 44A, 44B provide offsetting motions in the opposite radial direction so that new tracks continually fall within the ranges of motion in which the secondary actuators 44A, 44B can position the heads 30A, 30B without delaying the data transfer operations.

The total time spent in performing a write operation in the disk drive 20 using the multi-stage actuator 32 and the data transfer circuit 70 is:

$$T_{total} = T_{sk-ps} + T_l + KT_r \qquad (1)$$

where K is the number of data segments written.

In contrast, the total time spent in performing a write operation in a disk drive that employs a single stage actuator is:

$$T_{total} = T_{sk-ps} + K(T_r + T_l) + (K-1)T_{sk-s} \qquad (2)$$

where K is the number of data segments written.

Analysis of equation (1) shows that the rotational latency and initial seek time associated with the present invention become an increasingly smaller percentage of the total write time as the size of the data file increases. In contrast, the latency and seek times in a disk drive that employs a single stage actuator remain a constant percentage of the total time. Consequently, the present invention uses less time to write data than disk drives that employ single stage actuators and this time becomes an increasingly smaller percentage of the total write time as the size of the data file increases. Since statistically $T_{sk-s} + T_l > 0.5 T_r$, the time savings for a large data file can approach 33%.

The invention is particularly well-suited for reading and writing large data files, such as audio or video data files, that require numerous tracks to be stored upon. If desired, the controller in the data transfer device may include a firmware switch that enables and disables the high speed data transfer techniques described herein. When enabled, the data transfer device performs a data transfer operation in accordance with the invention, and when disabled, the data transfer device performs conventional data transfer operations. The firmware switch can be set either during manufacture of the disk drive or by a host computer that utilizes the disk drive in the field. For instance, if many large data files are contemplated then the switch can be set to enable the operation, whereas if small data files will predominate then the switch can be set to the disable the operation.

The invention is applicable or adaptable to disk drives in which: (1) there are two or more heads associated with a single surface of a disk and secondary actuators are associated with two or more of the heads; (2) there are two or more heads associated with disk surfaces that are, in turn, associated with different disks within the drive; (3) there are two or more primary actuators, rather than the single primary actuator described above; (4) a primary actuator is utilized that moves a head in a linear manner; (5) a secondary actuator is employed that moves a head a linear manner; (6) primary and secondary actuators are utilized that involve combinations of rotary and linear actuators; (7) the drive is a read-only drive, such as an optical drive; and (8) multistage actuators are employed that have three or more stages.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. The preferred embodiment described above is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A disk drive, comprising:
    first and second disk surfaces that are substantially parallel with and spaced from one another;
    first and second heads for transferring data to and from the first and second disk surfaces, respectively;
    a multi-stage actuator that includes a primary actuator for positioning the first and second heads, a first secondary actuator for positioning the first head, and a second secondary actuator for positioning the second head; and
    a data transfer circuit that (1) during a write operation separates a data file into alternating first and second segments using a multiplexer/demultiplexer and causes the first head to write the first segments to the first disk surface and the second head to write the second segments to the second disk surface, and (2) during a read operation causes the first head to read the first segments from the first disk surface and the second head to read the second segments from the second disk surface and reassembles the first and second segments using the multiplexer/demultiplexer to provide the data file.

2. The disk drive of claim 1, wherein during the write operation the first and second heads simultaneously write the first and second segments to the first and second disk surfaces, and during the read operation the first and second heads simultaneously read the first and second segments from the first and second disk surfaces.

3. The disk drive of claim 1, wherein during the write operation the first head writes the first segments to the first disk surface while the second head performs seek operations and the second head writes the second segments to the second disk surface while the first head performs seek operations, and during the read operation the first head reads the first segments from the first disk surface while the second head performs seek operations and the second head reads the second segments from the second surface while the first head performs seek operations.

4. The disk drive of claim 1, wherein the data transfer circuit includes a first channel associated with the first head and a second channel associated with the second head.

5. The disk drive of claim 4, wherein the data transfer circuit includes a first buffer in the first channel and a second buffer in the second channel, the first buffer stores the first segments during the read and write operations, and the second buffer stores the second segments during the read and write operations.

6. The disk drive of claim 4, wherein the data transfer circuit includes a buffer, the multiplexer/demultiplexer is connected between the buffer and the first and second channels, and the buffer stores the first and second segments during the read and write operations.

7. The disk drive of claim 1, wherein virtually all of the first and second segments have identical sizes.

8. The disk drive of claim 1, wherein the first and second segments, other than a final segment of the first and second segments, have sizes that correspond to available user data storage capacity of tracks on the first and second surfaces, respectively, to which they are written.

9. The disk drive of claim 1, wherein the first head reads and writes all user data that is written to and read from the first disk surface, and the second head reads and writes all user data that is written to and read from the second disk surface.

10. The disk drive of claim 1, wherein the first and second disk surfaces are opposing surfaces of a single magnetic disk.

11. A disk drive, comprising:

a first disk surface for storing data;

a second disk surface for storing data, wherein the second disk surface is separated from and substantially parallel to the first disk surface;

a first head for transferring data to and from the first disk surface;

a second head for transferring data to and from the second disk surface;

a multi-stage actuator for positioning the first and second heads at desired locations over the first and second disk surfaces, wherein the multi-stage actuator includes a primary actuator for simultaneously positioning of the first and second heads, a first secondary actuator for positioning of the first head without positioning the second head, and a second secondary actuator for positioning of the second head without positioning the first head;

an interface for transferring data to and from an exterior host computer; and a data transfer circuit coupled between the interface and the first and second heads, wherein the data transfer circuit includes a first channel for transferring data to and from the first head, a second channel for transferring data to and from the second head, and a multiplexer/demultiplexer, the first channel includes a first buffer, the second channel includes a second buffer, and the multiplexer/demultiplexer is coupled between the interface and the buffers, such that (1) during a write operation, the multiplexer/demultiplexer receives a data file from the interface, multiplexer/demultiplexer separates the data file into alternating first and second segments, the multiplexer/demultiplexer routes the first segments to the first buffer and the second segments to the second buffer, and the first head writes the first segments to the first disk surface and at substantially the same time that the second head writes the second segments to the second disk surface, and (2) during a read operation, the first head reads the first segments from the first disk surface and at substantially the same time that the second head reads the second segments from the second disk surface, the first buffer provides the first segments to the multiplexer/demultiplexer, the second buffer provides the second segments to the multiplexer/demultiplexer, and the multiplexer/demultiplexer combines the first and second segments into the data file and sends the data file to the interface.

12. The disk drive of claim 11, wherein during the read and write operations, the first and second secondary actuators position the first and second heads, respectively, during seek operations at substantially the same time.

13. The disk drive of claim 11, wherein during the read and write operations, a first data transfer rate occurs between the data transfer circuit and the interface, a second data transfer rate occurs between the first head and the first disk surface, the second data transfer rate occurs between the second head and the second disk surface, and the first data transfer rate is approximately twice the second data transfer rate.

14. The disk drive of claim 11, wherein during the read and write operations, the multi-stage actuator does not perform a seek operation while any of the segments are transferred by any of the heads.

15. The disk drive of claim 11, wherein virtually all of the first and second segments have identical sizes that correspond to a storage capacity of the buffers.

16. A disk drive, comprising:

a first disk surface for storing data;

a second disk surface for storing data, wherein the second disk surface is separated from and substantially parallel to the first disk surface;

a first head for transferring data to and from the first disk surface;

a second head for transferring data to and from the second disk surface;

a multi-stage actuator for positioning the first and second heads at desired locations over the first and second disk surfaces, wherein the multi-stage actuator includes a primary actuator for simultaneously positioning of the first and second heads, a first secondary actuator for positioning of the first head without positioning the second head, and a second secondary actuator for positioning of the second head without positioning the first head;

an interface for transferring data to and from an exterior host computer; and a data transfer circuit coupled between the interface and the first and second heads, wherein the data transfer circuit includes a first channel for transferring data to and from the first head, a second channel for transferring data to and from the second head, a multiplexer/demultiplexer and a buffer, and the multiplexer/demultiplexer is coupled between the buffer and the first and second channels, such that (1) during a write operation, the buffer receives a data file from the interface and sends the data file to the multiplexer/demultiplexer, the multiplexer/demultiplexer separates the data file into alternating first and second segments, the multiplexer/demultiplexer routes the first segments to the first channel and the second segments to the second channel, the first head writes the first segments to the first disk surface while the second head performs seek operations, and the second head writes the second segments to the second disk surface while the first head performs seek operations, and (2) during a read operation, the first head reads the first segments from the first disk surface while the second head performs seek operations and the second head reads the second segments from the second disk surface while the first head performs seek operations, the first channel provides the first segments to the multiplexer/demultiplexer, the second channel provides the second segments to the multiplexer/demultiplexer, the multiplexer/demultiplexer combines the first and second segments into the data file, the multiplexer/demultiplexer sends the data file to the buffer, and the buffer sends the data file to the interface.

17. The disk drive of claim 16, wherein during the write operation the first and second heads alternatingly write the first and second segments, one segment per track, and during the read operation the first and second heads alternatingly read the first and second segments, one segment per track.

18. The disk drive of claim 16, wherein during the read and write operations, a first data transfer rate occurs between the data transfer circuit and the interface, a second data transfer rate occurs between the first head and the first disk surface, the second data transfer rate occurs between the second head and the second disk surface, and the first and second data transfer rates are approximately the same.

19. The disk drive of claim 16, wherein during the write operation the first and second heads continuously and alternatingly write the first and second segments to the first and second disk surfaces, and during the read operation the first and second heads continuously and alternatingly read the first and second segments from the first and second disk surfaces.

20. The disk drive of claim 16, wherein during the write operation, while the primary actuator is moved, the first head writes the first segments to a first band of tracks on the first disk surface, one segment per track, and the second head writes the second segments to a second band of tracks on the second disk surface, one segment per track, and during the read operation, while the primary actuator is moved, the first head reads the first segments from the first band of tracks, one segment per track, and the second head reads the second segments from the second band of tracks, one segment per track.

21. A disk drive, comprising:
a first disk surface for storing data;
a second disk surface for storing data, wherein the second disk surface is separated from and substantially parallel to the first disk surface;
a first head for transferring data to and from the first disk surface;
a second head for transferring data to and from the second disk surface;
a multi-stage actuator for positioning the first and second heads at desired locations over the first and second disk surfaces, wherein the multi-stage actuator includes a primary actuator for coarsely positioning the first and second heads, a first secondary actuator for finely positioning the first head, and a second secondary actuator for finely positioning the second head; and p1 means, including a multiplexer/demultiplexer that transfers a data file between the disk surfaces and a host computer during read and write operations between the disk drive and the host computer, and using the multi-stage actuator, for transferring (1) a first portion of the data file between the first head and the first disk surface, and (2) a second portion of the data file between the second head and the second disk surface such that there is substantially no time between the transfer of the first portion and the transfer of the second portion in which the data file is not being transferred to a disk surface in the disk drive.

22. The disk drive of claim 21, wherein the means for transferring includes means for simultaneously transferring the first and second portions of the data file.

23. The disk drive of claim 22, wherein the means for transferring includes a first channel associated with the first head and a second channel associated with the second head.

24. The disk drive of claim 22, wherein the means for transferring includes a first buffer associated with the first head and a second buffer associated with the second head, and the first and second buffers store alternating segments of the data file during the read and write operations.

25. The disk drive of claim 22, wherein the means for transferring includes a divider for receiving the data file, dividing the data file into the first and second portions, directing the first portion to the first head and directing the second portion to the second head.

26. The disk drive of claim 22, wherein the means for transferring includes a merger for receiving the first portion from the first head, receiving the second portion from the second head, merging the first and second portions to assemble the data file, and directing the data file to the host computer.

27. The disk drive of claim 21, wherein the means for transferring includes means for transferring the first portion between the first head and the first disk surface while the second head is being moved by the second secondary actuator between tracks on the second disk surface during seek operations for the second head.

28. The disk drive of claim 27, wherein the means for transferring includes a first channel associated with the first head and a second channel associated with the second head.

29. The disk drive of claim 27, wherein the means for transferring includes a buffer associated with both the first and second heads, and the buffer stores the data file during the read and write operations.

30. The disk drive of claim 27, wherein the means for transferring includes means for transferring the second portion between the second head and the second disk surface while the first head is being moved by the first secondary actuator between tracks on the first disk surface during seek operations for the first head.

31. A method of writing a data file to a disk drive, wherein the disk drive includes first and second disk surfaces that are substantially parallel with and spaced from one another, first and second heads for transferring data to and from the first and second disk surfaces, respectively, and a multi-stage actuator that includes a primary actuator for simultaneously positioning the first and second heads, a first secondary actuator for positioning the first head without positioning the second head, and a second secondary actuator for positioning the second head without positioning the first head, the method comprising:

receiving a data file from a host computer exterior to the disk drive;

dividing the data file into alternating first and second segments using a multiplexer/demultiplexer;

using the first head to write the first segments to first tracks on the first disk surface while the primary actuator and the first secondary actuator position the first head; and using the second head to write the second segments to second tracks on the second disk surface while the primary actuator and the second secondary actuator position the second head.

32. The method of claim 31, including using the first and second heads to simultaneously write the first and second segments to the first and second tracks.

33. The method of claim 32, including using the first and second secondary actuators to simultaneously position the first and second heads over the first and second tracks, respectively, during simultaneous seek operations for the first and second heads.

34. The method of claim 33, including moving the primary actuator while using the first and second heads to simultaneously write the first and second segments to the first and second tracks and while using the first and second secondary actuators to simultaneously position the first and second heads over the first and second tracks during the simultaneous seek operations.

35. The method of claim 34, including receiving the data file at a first data transfer rate, using the first head to write the first segments to the first tracks at a second data transfer rate, and using the second head to write the second segments to the second tracks at the second data transfer rate, wherein the first data transfer rate is approximately twice that of the second data transfer rate.

36. The method of claim 31, including using the first and second heads to alternatingly and sequentially write the first and second segments to the first and second tracks such that one of the first segments is written to one of the first tracks between each sequentially written pair of the second segments and one of the second segments is written to one of the second tracks between each sequentially written pair of the first segments.

37. The method of claim 36, including, after using the first head to write one of the first segments to an initial track within the first tracks and using the second head to write one of the second segments to an initial track within the second tracks, using the first and secondary actuators to alternatingly and sequentially position the first and second heads over the first and second tracks, respectively, during sequential seek operations for the first and second heads, such that one of the seek operations for the first head occurs between each sequentially written pair of the second segments and between each sequential pair of seek operations for the second head, and one of the seek operations for the second head occurs between each sequentially written pair of the first segments and between each sequential pair of seek operations for the first head.

38. The method of claim 36, including moving the primary actuator while using the first and second heads to alternatingly write the first and second segments to the first and second tracks and while using the secondary actuators to alternatingly position the first and second heads during alternating seek operations.

39. The method of claim 36, wherein the first and second tracks are aligned with one another in a direction orthogonal to the first and second disk surfaces.

40. The method of claim 36, wherein the first and second segments, other than a final segment of the first and second segments, have sizes that correspond to available user data storage capacity of the first and second tracks, respectively, to which they are written.

41. A method for writing and reading a data file in a disk drive that includes a first disk surface for storing data, a second disk surface for storing data, wherein the second disk surface is separated from and substantially parallel to the first disk surface, a first head for transferring data to and from the first disk surface, a second head for transferring data to and from the second disk surface, and a multi-stage actuator for positioning the first and second heads at desired locations over the first and second disk surfaces, wherein the multi-stage actuator includes a primary actuator for coarsely positioning the first and second heads, a first secondary actuator for finely positioning the first head, and a second secondary actuator for finely positioning the second head, the method comprising:

(1) using the primary actuator to coarsely position the heads over a first range of tracks on the first and second disk surfaces;

(2) using the secondary actuators to initially position the heads over initial tracks within the first range of tracks; and (3) simultaneously transferring data between the heads and the initial tracks using a multiplexer/demultiplexer.

42. The method of claim 41, further comprising:

(4) using the secondary actuators to position the heads over other tracks in the first range of tracks; and (5) simultaneously transferring data between the heads and the other tracks.

43. The method of claim 42, further comprising:

(6) repeating steps (4) and (5) until data has been transferred to all the tracks within the first range of tracks.

44. The method of claim 42, wherein step (4) includes moving the primary actuator to position the heads over the other tracks in the first range of tracks.

45. The method of claim 42, wherein step (5) includes moving the primary actuator and the secondary actuators simultaneously in opposite radial directions so as to offset the movements of one another and change the tracks within the first range of tracks that fall within the ranges of motions of the secondary actuators.

46. A method of reading and writing a data file in a disk drive that includes a first disk surface for storing data, a second disk surface for storing data, wherein the second disk surface is separated from and substantially parallel to the first disk surface, a first head for transferring data to and from the first disk surface, a second head for transferring data to and from the second disk surface, and a multi-stage actuator for positioning the first and second heads at desired locations over the first and second disk surfaces, wherein the multi-stage actuator includes a primary actuator for coarsely positioning the first and second heads, a first secondary actuator for finely positioning the first head, and a second secondary actuator for finely positioning the second head, the method comprising:

(1) using the primary actuator to coarsely position the first head over a first range of tracks on the first disk surface and the second head over a second range of tracks on the second disk surface;

(2) using the first secondary actuator to initially position the first head over a first track within the first range of tracks and using the second secondary actuator to initially position the second head over a first track within the second range of tracks;

(3) sequentially transferring data between the first and second heads and tracks within the first and second range of tracks, one head at a time and one track at a time; and (4) sequentially using the first and second actuators to position the first and second heads over tracks within the first and second ranges of tracks, one head at a time and one track at a time.

47. The method of claim 46, wherein step (4) includes using the secondary actuators to position the heads in the same sequence as that used for the data transfer in step (3).

48. The method of claim 46, wherein step (4) includes using the first secondary actuator to position the first head over the first range of tracks during sequential seek operations in a single radial direction while the second head is transferring data in step (3), and using the second secondary actuator to position the second head over the second range of tracks during sequential seek operations in the single radial direction while the first head is transferring data in step (3).

49. The method of claim 46, wherein step (3) includes essentially continuously transferring the data.

50. The method of claim 46, wherein step (3) includes moving the primary actuator in a first radial direction while moving the secondary actuators in a second radial direction opposite the first radial direction so as to offset the movement of the primary actuator, thereby changing the tracks within the first and second ranges of tracks that fall within ranges of motion that the secondary actuators can position the heads.

* * * * *